(No Model.)

J. MARKS.
LAYING UNDERGROUND ELECTRIC WIRES.

No. 277,588. Patented May 15, 1883.

Attest:
Charles H. Pell
J. W. Henrich

Inventor:
James Marks,

UNITED STATES PATENT OFFICE.

JAMES MARKS, OF NEWARK, NEW JERSEY.

LAYING UNDERGROUND ELECTRIC WIRES.

SPECIFICATION forming part of Letters Patent No. 277,588, dated May 15, 1883.

Application filed July 13, 1882. (No model.)

*To all whom it may concern:*

Be it known that I, JAMES MARKS, a citizen of the United States, residing at Newark, in the county of Essex and State of New Jersey, have invented certain new and useful Improvements in the Laying of Underground Electric-Light and Telegraph Wires; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to certain improvements in the methods of and means for laying wires for electric-telegraphing and electric-lighting purposes in or under the ground, my object being to overcome various objections and disadvantages attaching to the methods and means heretofore employed and to reduce the cost of construction.

The invention will be hereinafter fully described, and finally pointed out in the claims.

Figure 1:
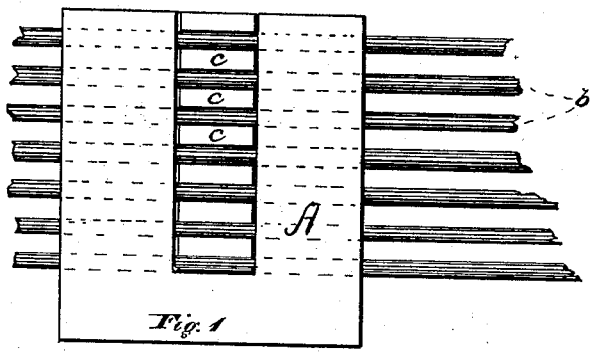
Figure 2:
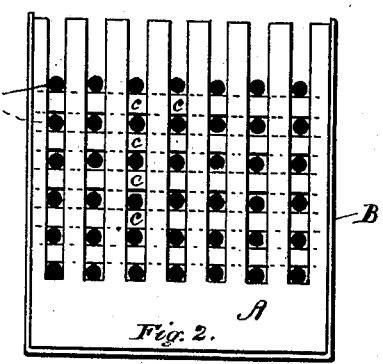
Figure 4:
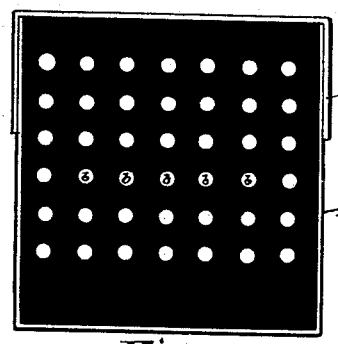
Figure 3:
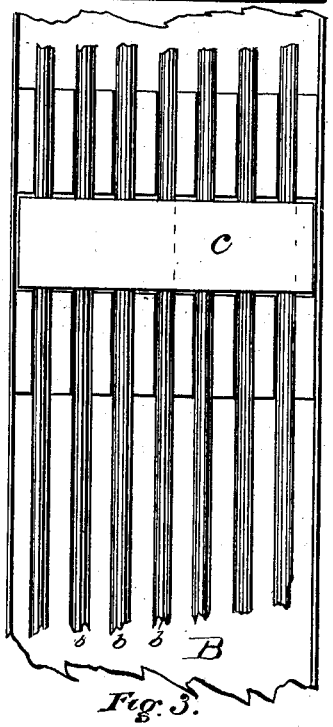
Figure 5:
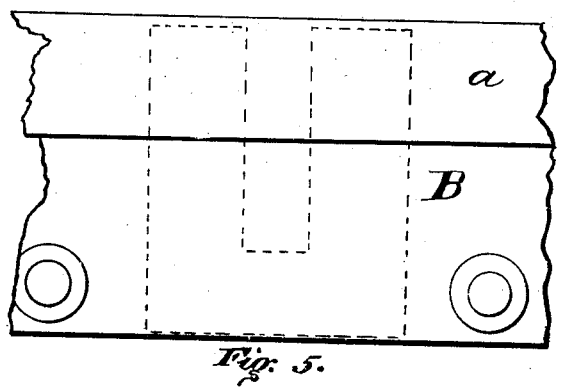

In the drawings, Figure 1 is a side elevation, illustrating a portion of my improvement, which I denominate the "rack," with the wires, &c., laid therein. Fig. 2 is an end view of the same inclosed at the bottom and sides with what I denominate a "box" or "trough." Fig. 3 is a top or plan view of the same. Fig. 4 is an end view of the trough and cover complete, with the wires therein surrounded with asphaltum. Fig. 5 is a side elevation of the same, showing other features which will be hereinafter referred to.

In carrying out my invention I construct racks A, of some hard close-grained wood—such as maple, beech, locust, or the like—for the reception and support of the wires $b$, as will be clearly understood by reference to Figs. 1, 2, and 3. These racks are set in metal boxes or troughs B, from four to six feet in length, more or less, their ends being jointed telescopically or otherwise, so as to form when in use a continuous tube or pipe. Said boxes are designed to be laid under or into the ground, or in some cases on the surface when an exigency requires it. As the wires are laid in the racks they are covered with asphaltum, which is poured into the boxes or troughs, all as will be more particularly described. It is proposed to lay the boxes or troughs entirely underground, or to sink them into the surface thereof, so that their tops will be level with the street, roadway, or sidewalk. The troughs or boxes are preferably square, any size that may be needed. A four (4) inch square box or trough will serve for about one hundred and fifty ordinary cotton-insulated No. 16 telegraph-wires. A greater or smaller number may be put into said sized troughs, according to the size of wire used, as will be manifest. The troughs may be made from either sheet or cast iron, adapted to withstand the heat when the asphaltum is in course of being melted and drawn off through the openings. The box is so constructed that one end will fit inside the end of an adjacent box to make a continuous trough. The cover $a$ is made of the same material, molded and cast to fit, and extending down on the sides of the box from one to four inches, or as far as may be required. Said boxes should be nailed or screwed down to a scantling of any durable wood or support, so bedded in the earth as to keep the boxes firm and support any weight or pressure that may come upon them. Said wood should be well coated with tar or other material to preserve it in the earth. T-connections, connecting-elbows, &c., are used for street-crossings and side lines through side streets, as will be understood.

My method of laying the troughs, &c., is somewhat similar to the method in which water and gas mains and pipes are laid for city purposes, my object being to supply every house, if necessary, with electricity, the same as it can be supplied with water or gas. The troughs, when made, should be coated with asphaltum, &c., to prevent decay or corrosion. The racks should be a little smaller than the troughs, so as to fit in easy, and may be placed at any distance apart deemed necessary. For example, on level ground a distance of six or eight feet will be sufficient, and upon inclined surfaces a less distance is advisable. The wires are laid as follows: One row along the bottom of trough, first having from one-quarter to one-half inch of hot asphaltum or other insulating material run into said trough and the racks firmly set in their places therein. After the first row or bottom wires are laid, a piece of glass, *c*, or other suitable material to fit must be laid into the transverse groove in the rack across the wires, then a thin coating of asphaltum poured on wires to slightly cover them. The trough is then ready for another row of wires, another piece of glass, and another coating of asphaltum, and so on until the rack is full. Ten wires in height will be found more convenient than a larger number. When the wires are all laid the trough should be filled full of the hot asphaltum, as indicated in Fig. 4. Before the trough is covered up cross-lines or side lines will be laid in the same way. Great care must be taken that the wires are laid parallel with each other, and not crosswise, so as to facilitate the numbering and finding of any wire, as indicated in Fig. 2.

As the laying of side lines is supposed to be done when the main lines are laid, and in the way, further explanation on this point is not deemed necessary.

In order to tap the trough to make repairs, two holes half an inch in diameter, more or less, one in each side of the rack, as indicated in Fig. 5, are to be drilled. Heat from a torch, burner, charcoal-furnace, or any other device that will answer, is to be applied to the pipe till all the asphaltum in the spaces around the rack is melted and run out through the said holes, which leaves the wires bare, and the wire or wires wanted can be selected according to the scale and the repairs or connections made, as will be readily understood. The holes drilled to empty the trough may then be plugged up, or they may be used to screw connecting-boxes into, which contain connecting-wires. After the repairs or connections are made the trough is refilled with asphaltum and covered up as before. The rack may be lifted out of the trough, if desired, and propped on top, to facilitate the making of connections, &c.

The wires to be used may be copper covered or insulated with cotton-thread or other material, and any suitable size; or iron wire covered in the same manner will answer every purpose and be cheaper. As the air is excluded from the wires they will not be liable to corrode or rust. The racks in which the wires rest should be thoroughly dried, then soaked in a thin solution of shellac, and when dry soaked a second time. A rack may be made to answer the same purpose by driving pegs of wood in a block of wood, or of any other insulating material, such as hard rubber, gutta-percha, &c. In this way wires can be laid in rotation, numbered, thoroughly protected when laid, and easily got at to make repairs or connections, all of which is accomplished through the use of the rack in connection with the other details of laying, as described.

The advantages in other respects of my improvement are numerous. First, it is cheaper than the present pole system; second, any number of wires may be laid in a trough and easily got at; third, long lines can be laid on the surface of railroads without any inconvenience to the line; fourth, the trough may be laid level with the street of a city and answer as a part of the road-bed, gutter, or sidewalk; fifth, it does away with the pole system and does away with the necessity of the employés of a telegraph company going into private houses to lay or attach the wires; sixth, the saving of expense in making repairs, as compared with the old system, will manifestly be enormous. Indeed repairs will seldom, if ever, be needed.

Having thus described my invention, what I claim, and wish to secure by Letters Patent, is—

1. An improved device for receiving and insulating underground-telegraph wires, the same consisting in the metallic trough B, cover *a*, rack A, having a series of slots running parallel with the wires and a transverse slot to receive a series of glass insulators, and said glass insulators, all arranged and operating substantially as herein set forth.

2. In combination, the trough B and cover *a*, formed of metal having openings therein, the rack A, slotted to receive the wires, insulators arranged between the wires in transverse slots in the rack, and asphaltum or similar non-conducting and fusible material, all arranged and operating substantially as set forth.

In testimony that I claim the foregoing I have hereunto set my hand this 3d day of July, 1882.

JAMES MARKS.

Witnesses:
OLIVER DRAKE,
CHARLES H. PELL.